US011734558B2

(12) United States Patent
Saleh et al.

(10) Patent No.: US 11,734,558 B2
(45) Date of Patent: Aug. 22, 2023

(54) MACHINE LEARNING MODULE TRAINING USING INPUT RECONSTRUCTION TECHNIQUES AND UNLABELED TRANSACTIONS

(71) Applicant: PayPal, Inc., San Jose, CA (US)

(72) Inventors: Moein Saleh, Campbell, CA (US);
Chiara Poletti, San Jose, CA (US);
Sina Modaresi, San Jose, CA (US);
Yang Chen, San Jose, CA (US); Xing Ji, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 295 days.

(21) Appl. No.: 16/900,129

(22) Filed: Jun. 12, 2020

(65) Prior Publication Data

US 2021/0390385 A1 Dec. 16, 2021

(51) Int. Cl.
*G06Q 40/00* (2023.01)
*G06N 3/08* (2023.01)
*G06Q 20/30* (2012.01)
*G06N 3/04* (2023.01)

(52) U.S. Cl.
CPC ............ *G06N 3/08* (2013.01); *G06N 3/04* (2013.01); *G06Q 20/30* (2013.01)

(58) Field of Classification Search
USPC .................................. 705/35, 40, 39, 38, 37
See application file for complete search history.

(56) References Cited

U.S. PATENT DOCUMENTS

| 10,430,946 | B1 | 10/2019 | Zhou et al. |
| 2018/0293493 | A1* | 10/2018 | Kalamkar ............... G06T 1/20 |
| 2019/0130406 | A1* | 5/2019 | Marcjan ................ G06N 20/00 |
| 2019/0156211 | A1* | 5/2019 | Dong .................... G06N 3/04 |

(Continued)

OTHER PUBLICATIONS

Classical and Deep Learning Classifiers for Anomaly Detection; 2019 16th International Bhurban Conference on Applied Sciences and Technology (IBCAST) (pp. 614-618); Manahil Raza, Usman Qayyum; Jan. 8, 2019. (Year: 2019).*

(Continued)

*Primary Examiner* — Tien C Nguyen
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed relating to improving machine learning classification using both labeled and unlabeled data, including electronic transactions. A computing system may train a machine learning module using a first set of transactions (of any classifiable data) with label information that indicates designated classifications for those transactions and a second set of transactions without label information. This can allow for improved classification error rates, particularly when additional labeled data may not be present (e.g., if a transaction was disallowed, it may not be later labeled as fraudulent or not). The training process may include generating first error data based on classification results for the first set of transactions, generating second error data based on reconstruction results for both the first and second sets of transactions, and updating the machine learning module based on the first and second error data.

20 Claims, 8 Drawing Sheets

(56) References Cited

U.S. PATENT DOCUMENTS

2019/0378050 A1* 12/2019 Edkin .................... G06N 20/20
2020/0036528 A1*  1/2020 Ortiz ....................... G10L 17/00
2020/0151728 A1*  5/2020 Waters ................ H04L 63/1425

OTHER PUBLICATIONS

Credit Card Fraud Detection Using Learning to Rank Approach; 2018 International Conference on Computation of Power, Energy, Information and Communication (ICCPEIC) (pp. 191-196); N Kalaiselvi, S Rajalakshmi, J Padmavathi, Joyce. B. Karthiga; Mar. 28, 2018. (Year: 2018).*
Thomas Robert et al., "HybridNet: Classication and Reconstruction Cooperation for Semi-Supervised Learning," arXiv:1807.11407v1 [cs.LG] Jul. 30, 2018; 28 pages.
International Search Report and Written Opinion in PCT Appl. No PCT/US2021/034345 dated Sep. 24, 2021, 21 pages.
International Preliminary Report on Patentability for Application No. PCT/US2021/34345 dated Dec. 22, 2022, 12 pages.

* cited by examiner

Train a machine learning module to classify electronic transactions, where the training uses a first set of transactions with label information that indicates designated classifications for those transactions and a second set of transactions without label information.
610

Generate first error data based on classification results generated by the machine learning module for the first set of transactions.
620

Generate second error data based on reconstruction results generated by an input reconstruction module for both the first and second sets of transactions.
630

Update the machine learning module based on the first and second error data.
640

Fig. 6

MACHINE LEARNING MODULE TRAINING USING INPUT RECONSTRUCTION TECHNIQUES AND UNLABELED TRANSACTIONS

BACKGROUND

Technical Field

This disclosure relates generally to fundamental improvements for machine learning techniques, and, more specifically, to techniques for training a machine learning module using unlabeled data (e.g., transactions), which results in improved transaction security, according to various embodiments.

Description of the Related Art

Machine learning techniques can be used to classify various types of data, including transactions. As one example, machine learning could teach a computer how to automatically recognize whether a digital picture has a human face within the image. As another example, a machine learning module may classify an electronic monetary transaction as fraudulent or legitimate. Based on this classification, a transaction processing server may choose to approve or deny a requested transaction. Such classifications may assist transaction processing systems in preventing fraudulent transactions, the execution of which can consume valuable computing and network resources (e.g., a database retrieval of the necessary information to process the transaction, network communication to various parties to facilitate transaction completion, etc.). In situations where a transaction is denied, the consequences of allowing the transaction (e.g., if the transaction was actually fraudulent or not) will be unknown. Said another way, labels (e.g., fraud or not) will typically not be available for denied transactions. Therefore, machine learning modules are traditionally unable to train on these denied transactions in future rounds of training. Applicant recognizes, however, that the inability to use discarded (unlabeled) data for machine learning classification presents a significant opportunity for improvement within the field of machine learning.

BRIEF DESCRIPTION OF THE DRAWINGS

FIG. 6 is a flow diagram illustrating an example method for training a machine learning module using input reconstruction techniques and unlabeled transactions, according to some embodiments.

Figure 1:
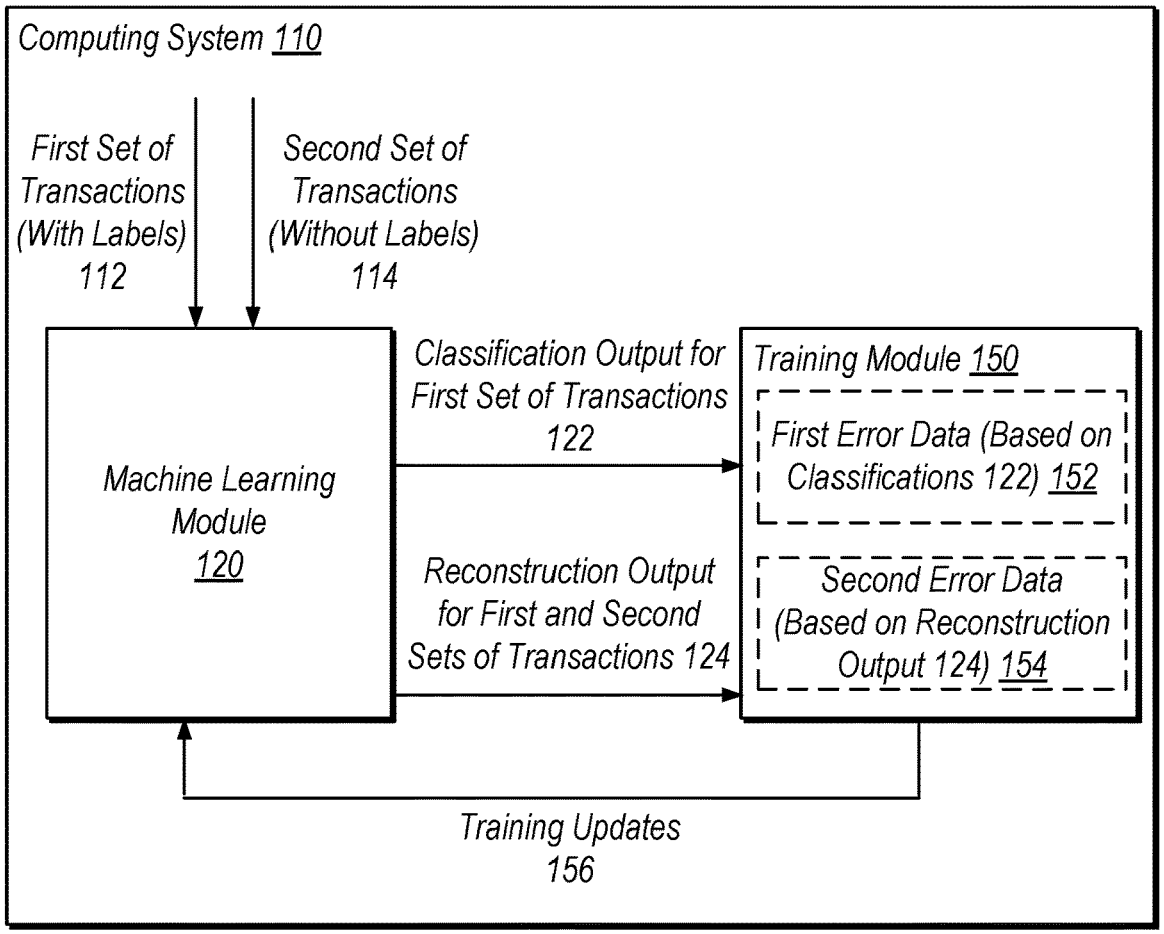
FIG. 1 is a block diagram illustrating an example system configured to train a machine learning module, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computing system configured to train a machine learning module to classify electronic transactions" is intended to cover, for example, a computer system that performs this function during operation, even if it is not currently being used (e.g., when its power supply is not connected). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U. S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a computing system having multiple user accounts, the terms "first" and "second" user accounts can be used to refer to any users. In other words, the "first" and "second" user accounts are not limited to the initial two created user accounts, for example.

When the term "or" is used in this disclosure with respect to a list of options, it will generally be understood to be used in the exclusive sense unless the context provides otherwise. Thus, a recitation of "x or y" is equivalent to "either x or y, but not both." On the other hand, a recitation such as "x or y, or both" is to be interpreted in the inclusive sense. A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, a "module" refers to software and/or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

DETAILED DESCRIPTION

A machine learning module, in various embodiments, is configured to classify particular data, including electronic transactions. These classifications in some instances may be used to detect, and potentially block, fraudulent transactions. In some embodiments, a computing system trains the machine learning module using both transactions with labels and transactions without labels. Typically, transactions for which label information is available are those that were previously approved, while transactions for which label information is unavailable are those that were previously denied. By way of further explanation, when a transaction is approved (allowed to proceed), it may be later reported as fraud by a consumer, merchant, or other entity. At this point, the transaction can be labeled as fraudulent, and used for machine learning purposes as a known example of real-world fraud. If a suspicious transaction is denied, however, because a machine learning model already indicated a high fraud probability, then the transaction is never completed, and a label for "fraud" is never generated in the future—we may never know if the transaction was really fraud, or if it was a false positive, because the transaction did not execute. This poses a problem, because various existing techniques may not allow these unlabeled, denied transactions to be used to build even better machine learning classifiers.

Thus, when supervised machine learning is typically used by a system, this system takes advantage of datasets that have labels. During the training process, a machine learning model is revised to generate predictions for transactions that are as close as possible to known labels for these transactions. For this reason, in various supervised learning techniques, transactions with labels are often used to train machine learning models, while transactions without labels are not generally used in training. As such, transactions that the trained machine learning model declines may not be usable for future training. In many situations, future generations of the machine learning model may miss out on training on fraud cases occurring in transactions that were previously declined. That is, if a model were to train on a substantial population of fraudulent transactions, it may be more accurate in generating predictions for requested transactions.

In some situations, in order to generate labeled data, a control group (e.g., a set of incoming transaction requests) could be used that would be approved by a system regardless of predictions generated by a machine learning model for these transactions. This approach has drawbacks, however. The system would later determine a label showing whether those control group transactions were actually fraudulent in order to use that data for further improving a machine learning model. Thus, these labeled transactions from the control group (which may contain real-world fraud) are then used to train the model. This solution, however, introduces certain problems. For example, in this solution, a system would need dedicated architecture that allows for some transactions to be approved even if a machine learning model predicts that they are fraudulent. In addition, this may introduce unfair treatment of certain customers (e.g., in the credit approval domain), result in large financial losses, violate terms and conditions of a company involved in the transaction process, etc. Along with these problems, such a control group may not truly be random as certain rules may be applied to the selection of the "random" group to prevent fraudulent users from retrying hundreds of transactions in order to get at least one selected for the control group.

The disclosed embodiments discussed in detail below do not rely on a control group and, as such, may advantageously improve the accuracy of a machine learning module, which in turn may reduce losses a company experiences due to fraudulent transactions, for example. Specifically, techniques are disclosed for training a machine learning module to classify electronic transactions using a first set of transactions with label information that indicates designated classifications for those transactions and a second set of transactions without label information. This training includes updating the machine learning module based on comparing classification results generated by the machine learning module with known classifications and comparing reconstruction results generated by an input reconstruction module with the input being reconstructed. In particular, the labeled transactions may be used for training based on both classification and reconstruction results while the un-labeled transactions may be used based on their reconstruction results but not their classification results. Such techniques may advantageously utilize data obtained from transactions without labels as training data. In addition, disclosed techniques may advantageously improve the accuracy of a machine learning module in generating predictions for transactions, for example, which in turn may improve transaction security relative to techniques that do not use un-labeled transactions for training.

Note that the techniques described in this patent application are generally applicable to any type of data for machine learning—in particular these techniques are helpful in any classification system where certain data is prevented from being labeled because a machine learning classifier is already in use. If the classifier indicates the data likely falls under X classification rather than Y classification, and the data is then handled differently so that it is unknown (in the real world) what classification the data should have, then the present techniques provide an improvement where the classifier can still make use of the unlabeled data to refine and improve its ability to make classifications. Thus, while various examples are described below with respect to electronic monetary transactions, these techniques are not limited to such types of data.

Example Training with Unlabeled Transactions

FIG. 1 is a block diagram illustrating an example system configured to train a machine learning module. In the illustrated embodiment, system 100 includes a computing system 110 configured to train machine learning module 120 using training module 150.

Computing system 110, in the illustrated embodiment, inputs a first set 112 of transactions with labels and a second set 114 of transactions without labels into machine learning module 120. Labels may indicate, for example, designated classifications for various transactions, or other types of data labels in various other instances. Specifically, in the context of electronic monetary transactions, labels may indicate whether the transaction is considered to be fraudulent or not. In some embodiments, transactions included in the first set 112 and the second set 114 are electronic monetary transactions.

Note that classifying transactions as fraudulent is one non-limiting example embodiment of the classification that may be performed by computing system 110. In various embodiments, computing system 110 may determine whether to: approve a transaction (e.g., an electronic monetary transaction), provide credit to a customer (e.g., predict whether they will default on their loan), types of objects (e.g., medical objects) within images (e.g., using pixel data), recommend a product to a customer (e.g., if the product is not displayed, then the system will not know whether the customer would have purchased the displayed product), mark certain content as offensive and remove the content, decline social network requests, etc.

In some embodiments, the first set 112 includes transactions that were previously approved. Therefore, labels for these transactions may be known. In some embodiments, the second set 114 includes transactions that were previously denied. Because these transactions are incomplete, it is unknown whether they were correctly approved or denied (e.g., whether they turned out to be fraudulent after classification). Therefore, labels for these transactions are unknown. Computing system 110 may be a transaction classification system (e.g., a PAYPAL transaction server).

Machine learning module 120 is operable to generate classification output 122 for the first set 112 of transactions and reconstruction output 124 for first and second sets 112 and 114 of transactions. Based on outputs 122 and 124, training module 150 is operable to generate first error data 152 and second error data 154, respectively. Training module 150 is also operable to generate training updates 156 based on the error data and send these updates to machine learning module 120. In some embodiments, training updates 156 include adjusted training weights. Classification output 122 for a particular transaction may indicate the probability that the particular transaction is fraudulent. In other embodiments, machine learning module 120 is operable to generate classification output 122 for the second set 114 of transactions. A machine learning module, as with other modules described herein, may be implemented as a set of stored computer executable instructions that may perform various operations, as discussed further below.

In some embodiments, first error data 152 indicates differences between classification results generated by machine learning module 120 (e.g., classification output 122) and designated classifications (indicated by labels for the first set of transactions). Note that non-labeled transactions are not used in calculating first error data 152 in the illustrated example. In some embodiments, the second error data 154 indicates differences between reconstruction results (e.g., reconstruction output 124) and input being reconstructed (e.g., the input to machine learning module 120 for the training transactions). Second error data 154 may be determined based on both labeled and unlabeled transactions.

First error data 152 may be determined according to the following formula: param_A*classification_loss. This formula may be used to calculate loss for machine learning module 120 when feeding transactions with labels into the module. In contrast, second error data 154 may be determined according to the following formula: param_B*reconstruction_loss. This formula may be used to calculate loss for machine learning module 120 when feeding both transactions with labels and transactions without labels into the module. In some situations, the total error (not shown) for labeled transactions may be determined according to the following formula: (param_A*classification_loss)+ (param_B*reconstruction_loss). In some situations, the value for hyperparameter_param_B may be different when determining reconstruction loss for non-labeled transaction than when determining reconstruction loss for labeled transactions. For example, second error data may be determined according to param_B*reconstruction_loss or param_C*reconstruction_loss based on whether a transaction is labeled. Transactions may have a data field or tag that indicates whether they are labeled so that the computing system 110 knows which formula to use. The parameters A-C included in these formulas may be hyperparameters that are tunable during training.

In some embodiments, training module 150 backpropagates output of machine learning module 120 during training. For example, as discussed below with reference to FIGS. 4 and 5, error data generated based on both labeled and unlabeled transactions may drive backpropagation through machine learning module 120 during training.

In some embodiments, machine learning module 120 comprises a neural network. For example, machine learning module 120 may include a neural network that includes multiple layers or nodes that may be trained using semi-supervised learning techniques via cooperation of both classification and reconstruction of training data. As one specific example, machine learning module 120 may include a HybridNet that leverages unlabeled data to improve classification of transactions.

In various embodiments, disclosed training techniques that use reconstruction feedback for unlabeled transactions may improve the classification accuracy of machine learning module 120, relative to techniques that do not train using unlabeled transactions.

Example Transaction Classification

Figure 2:
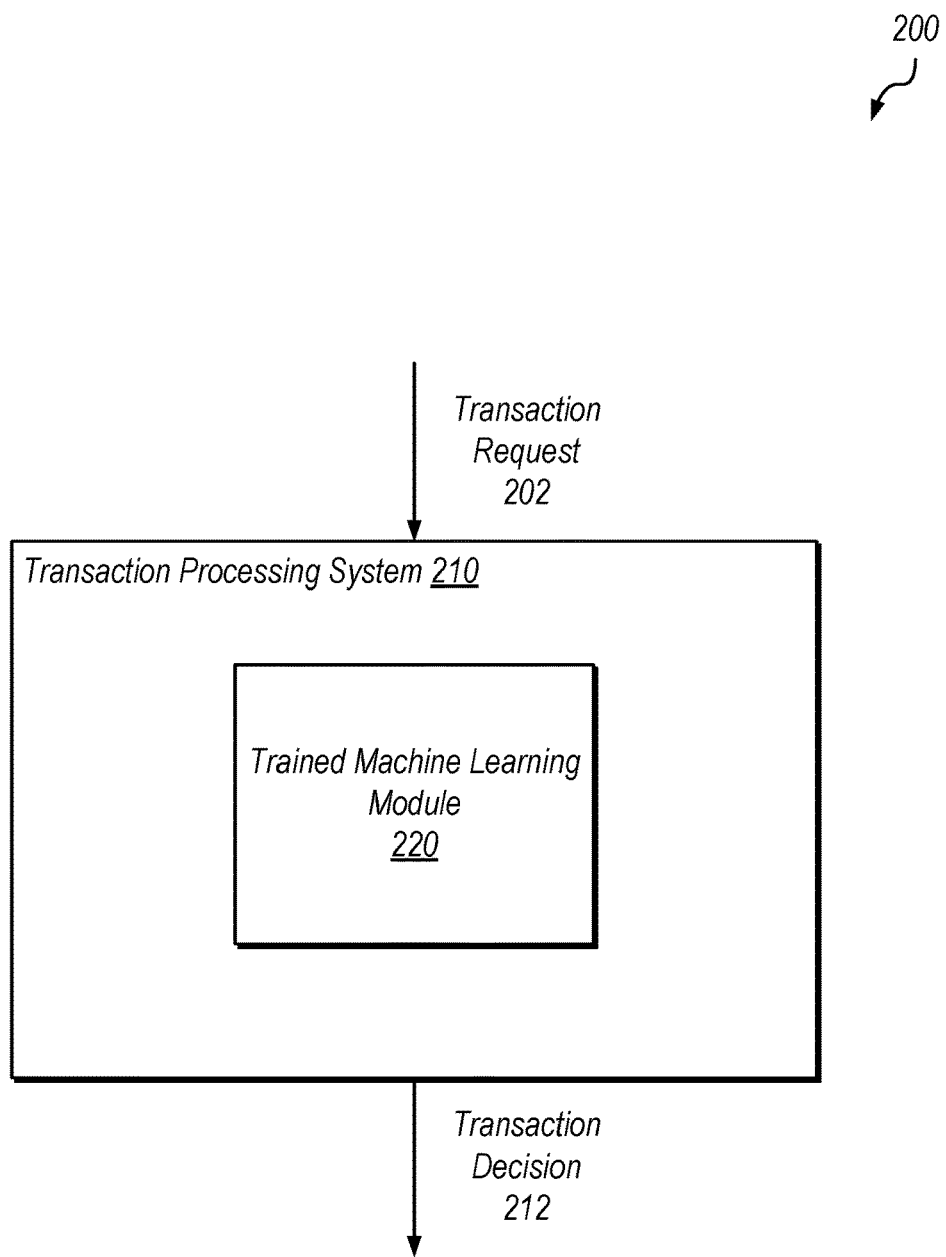
FIG. 2 is a block diagram illustrating an example system configured to process transactions using a trained machine learning module, according to some embodiments.

FIG. 2 is a block diagram illustrating an example system configured to process transactions using a trained machine learning module. In the illustrated embodiment, system 200 includes a transaction processing system 210 configured to process various transactions using a trained machine learning module 220.

Transaction processing system 210, in the illustrated embodiment, receives a transaction request 202. Transaction processing system 210 is configured to use trained machine learning module 220 to classify a transaction specified in request 202, according to various embodiments. Based on the output of trained machine learning module 220, transaction processing system 210 is configured to output transaction decision 212. In some embodiments, transaction decision 212 indicates whether the requested transaction is approved.

In some embodiments, transaction request 202 is received for processing from a payment application downloaded on a user device. Processing the transaction may include an authentication procedure (e.g., of the user device) as well as an assessment of the transaction itself (e.g., a classification). For example, the authentication procedure may include authentication of user account credentials. Assessment of the transaction may be performed by trained machine learning module 220 which is operable to generate predicted classifications for transactions. These predictions may indicate a confidence level of the model that a particular transaction is fraudulent or not (e.g. a score could be assigned for a transaction from 0 to 100, with 0 indicating a zero (or extremely low) level of fraud likelihood, while 100 indicates a 100% chance (or extremely high) level of fraud likelihood).

A machine learning module may become stale due to changes over time, e.g., such that transactions used for training are different than production transactions and one or more models provide less accurate predictions for the production transactions. A machine learning module that becomes stale may benefit from additional training, e.g., using more recent transactions for training. While the reconstruction output may be useful to detect a stale model during production, in various disclosed techniques the reconstruction output is also used during training for partially-unsupervised training using unlabeled transactions.

Example Machine Learning Training

Figure 3:
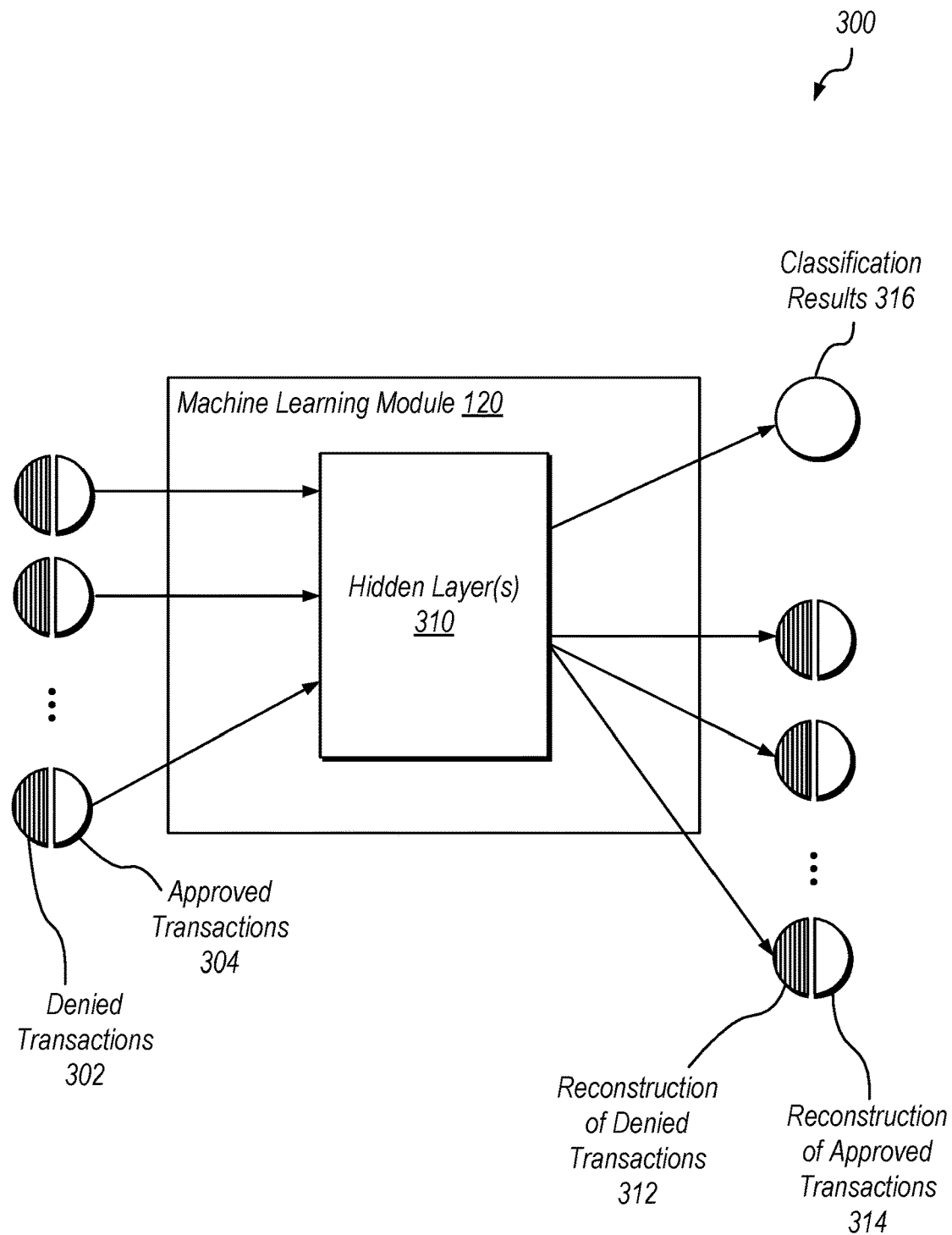
FIG. 3 is a diagram illustrating example training techniques, according to some embodiments.

FIG. 3 is a block diagram illustrating example training techniques. In the illustrated embodiment, system 300 includes machine learning module 120 which in turn includes hidden layer(s) 310.

Machine learning module 120, in the illustrated embodiment, receives a plurality of approved transactions 304 and a plurality of denied transactions 302 via an input layer. Approved transactions 304 are one example of first set 112 of transactions, while denied transactions 302 are one example of the second set 114 of transactions. Machine learning module 120 passes these transactions (with or without label data) through one or more hidden layers 310. The one or more hidden layers 310 of machine learning module 120 are executable to generate classification results 316, reconstruction 312 of denied transactions 302, and reconstruction 314 of approved transactions 304. The classification results 316 may specify designated classifications for both the approved transactions 304 and the denied transactions 302 generated by machine learning module 120, although the classification results for denied transactions 302 may not be used for backpropagation. The approved transactions 304 include labels specifying whether these transactions are fraudulent or not. The denied transactions do not include labels.

Machine learning module 120 includes a neural network with at least one hidden layer 310, in some embodiments. In some situations, module 120 includes a plurality of different layers. For example, module 120 may include a hidden layer of a neural network with a set of weights that are multiplied by input vectors that specify characteristics of denied transactions 302 and approved transactions 304. The output of this hidden layer may be provided to a subsequent layer, and so on. The classification and reconstruction portions of the machine learning module may or may not have different numbers of layers and may or may not share certain layers. In some embodiments, the classification and reconstruction portions of the machine learning module are split after a first hidden layer, and the reconstruction output is based on outputs of the first hidden layer, but not on subsequent layers used for classification.

Various intermediate hidden layers with respective sets of weights may be included between the first hidden layer of the neural network and the classification layer and reconstruction layer. In some situations, classification and reconstruction are performed by two different portions of the same hidden layer included in machine learning module 120. In some situations, machine learning module 120 includes a plurality of layers prior to the first hidden layer that provide inputs to the first hidden layer. That is the first hidden layer is not necessarily the "first" layer in chronological order to receive machine learning inputs.

In some embodiments, machine learning module 120 provides classification results 316 to training module 150 (shown in FIG. 1). In some embodiments, machine learning module 120 generates new classification results 316 and reconstructions 312 and 314 based on the training updates 156 received from training module 150. This cycle of training may repeat indefinitely or until training module 150 is satisfied with the training of machine learning module 120. For example, training module 150 may be satisfied when classification results 316 match known classifications for approved transactions 304 to within a training threshold and the reconstruction results match the actual inputs to within a training threshold.

Example Backpropagation

Figure 4:
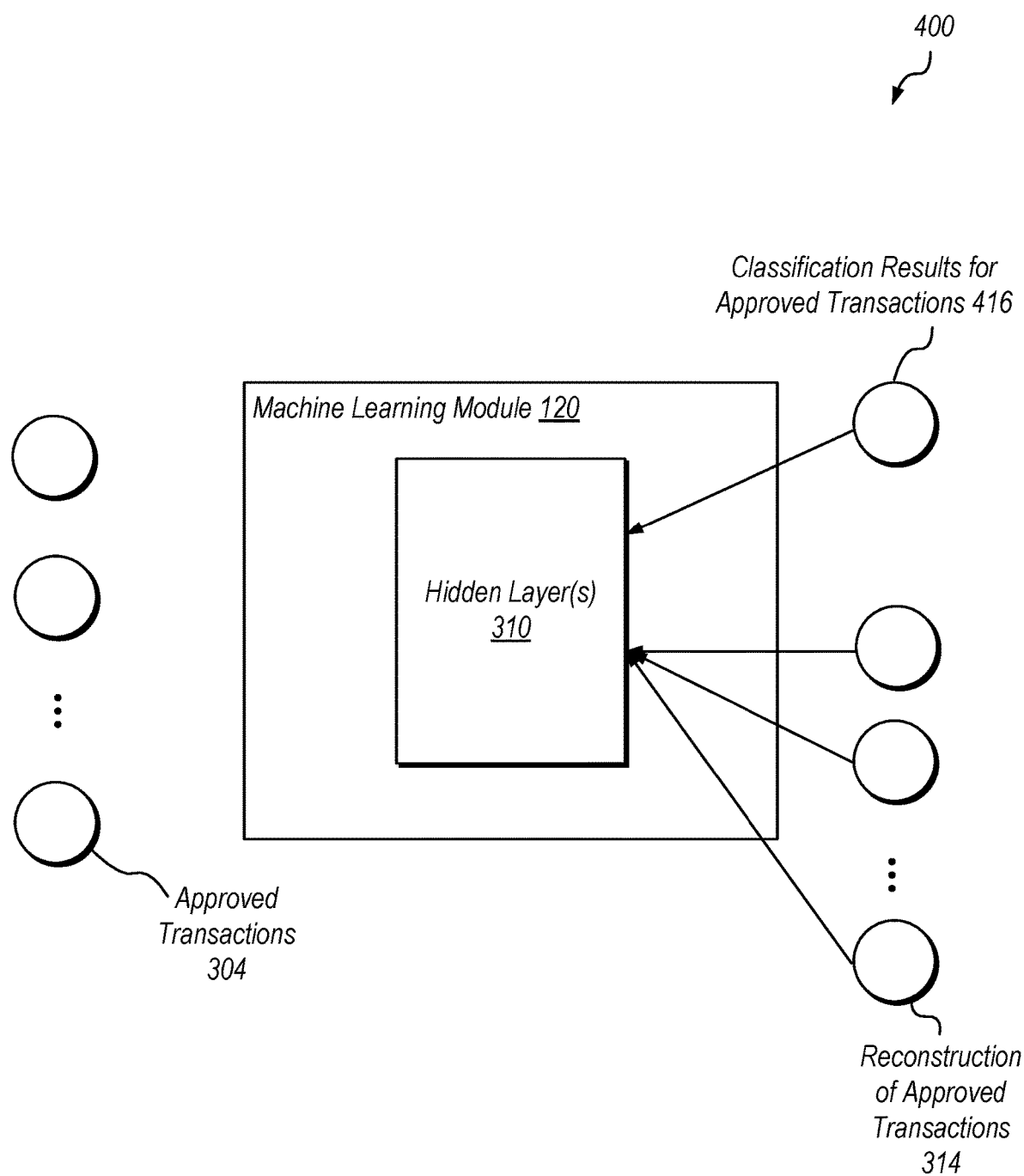
FIG. 4 is a diagram illustrating example training using approved transactions, according to some embodiments.
Figure 5:
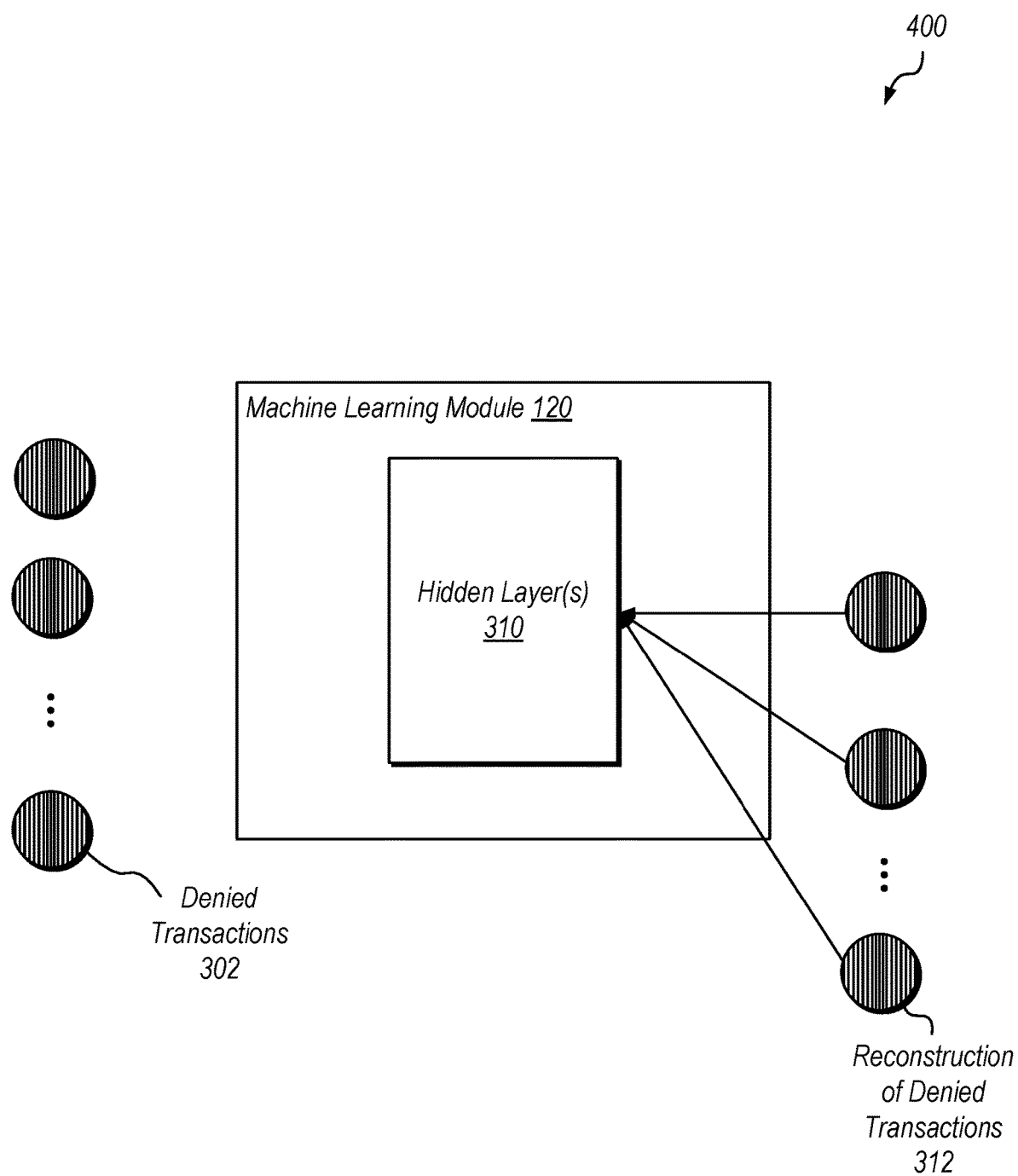
FIG. 5 is a diagram illustrating example training using denied transactions, according to some embodiments.

FIGS. 4 and 5 are block diagrams illustrating example training using approved and denied transactions respectively. These figures illustrate example backpropagation of classification results for approved transactions only and backpropagation of reconstructions results for both approved and denied transactions.

System 400, in the illustrated embodiment, is configured to train machine learning module 120 using backpropagation techniques. For example, system 400 is configured to backpropagate classification results 416 for approved transactions through the hidden layer(s) 310 of the neural network included in machine learning module 120. In addition, in the illustrated embodiment, system 400 is configured to backpropagate reconstruction 314 of approved transactions.

For denied transactions, the system may backpropagate reconstruction 312 of denied transactions through the hidden layer(s) 310 of the neural network included in machine learning module 120. Note that, for denied transactions, classification results are not backpropagated through hidden layer(s) during training. In this way, denied transactions, even though they do not have known labels, may impact error data and weights of machine learning module 120 during training and ultimately impact the trained machine learning module used during production. Said another way, the disclosed techniques may advantageously exploit intelligence obtained from transactions without labels when training a machine learning module, while maintaining the same objective for the machine learning module (e.g., classification of transactions).

Example Techniques that use Classification Distributions for Non-labeled Transactions In some embodiments, machine learning module 120 also generates classification results 316 for denied transactions 302 (shown in FIG. 3) and provides these classifications to system 300. System 300 may check whether the classification results for these non-labeled transactions match an expected distribution. For example, in systems where the non-labeled transactions were denied transactions, these transactions would be expected to include a relatively high number of transactions to be classified as fraudulent.

For example, if classification results for denied transactions 302 match, within a threshold degree, with an expected distribution of classification results for non-labeled transactions, this may indicate that the model is performing well. As one specific example, out of 100 transactions, an expected distribution of classification results for non-labeled transactions may include 80 transactions that are classified as fraudulent and 20 transaction that are classified as not fraudulent according to some classification threshold. If the classification results for non-labeled transactions are within a threshold from this distribution (e.g., include at least 75 transactions classified as fraudulent), then the system may be showing satisfactory performance.

If the expected distribution does not occur, in some embodiments the system may roll back updates to machine learning module 120. Further, the system may subsequently train without non-labeled transactions. As another example, the system may reduce the param_C hyperparameter to reduce the impact of non-labeled transactions on backpropagation. As another example, the system may require additional training iterations.

Expected distributions and threshold degrees of matching may be defined in various ways in different embodiments. For example, an expected distribution for a set of 20 transactions, might be four fraudulent classifications and sixteen not fraudulent classifications. As another example, on a scale of 0 to 1, the system may expect 80% of unlabeled transactions to have a predicted classification of 0.3 or less. Therefore, classifications output during training for a set of transactions, for example, may be said to match a known set of classifications for the set of transactions within a threshold degree according to various thresholds.

Example Methods

FIG. 6 is a flow diagram illustrating an example method for training a machine learning module using input reconstruction techniques and unlabeled transactions, according to some embodiments. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. According to various embodiments, some or all elements of FIG. 6 and FIG. 7 may be performed by computing system 110.

At 610, in the illustrated embodiment, a computing system trains a machine learning module to classify electronic transactions, wherein the training uses a first set of transactions with label information that indicates designated classifications for those transactions and a second set of transactions without label information. In some embodiments, the second set of transactions are incomplete transactions and the first set of transactions are completed transactions. In some embodiments, transactions in the first and second sets of transactions are electronic monetary transactions, where classifications output by the trained machine learning module specify whether transactions are authorized by an entity that had been requested to authorize those transactions. In some embodiments, transactions in the first set of transactions are approved transactions and transactions in the second set of transactions are denied transactions.

At 620 the computing system trains the machine learning module by generating first error data based on classification results generated by the machine learning module for the first set of transactions. In some embodiments, the computing system determines whether classification results for the second set of transactions match, within a threshold degree, with an expected distribution of classification results for non-labeled transactions.

At 630, the computing system further trains the machine learning module by generating second error data based on reconstruction results generated by an input reconstruction module for both the first and second sets of transactions. In some embodiments, the reconstruction results indicate whether a model implemented by the machine learning module is stale. In some embodiments, the input reconstruction module generates output for the first and second sets of transactions based on output of a first hidden layer of a neural network and not based on output of subsequent layers of the neural network. In some embodiments, the input reconstruction module is included in the machine learning module. For example, in a machine learning module that implements a neural network, a portion of the network may be used for input reconstruction, alone or among other uses of that portion. In other embodiments, the input reconstruction module and the machine learning module are two separate entities operable by the computing system to generate classifications for requested transactions.

In some embodiments, the computing system tags transactions in the second set of transactions to indicate that these transactions do not have label information, wherein one or more elements of the machine learning module are configured not to generate error data based on classification results for transactions of the second set of transactions based on detecting the tagging. The term "tag" is intended to be construed broadly according to its well-understood definition, which includes setting a value of a data field (e.g., metadata) for an entity. For example, tagging transactions in the second set of transactions may include associating metadata with the transactions. This metadata specifies that these transactions do not have label information.

At 640, the computing system updates the machine learning module based on the first and second error data. In some embodiments, subsequent to the updating, the computing system further updates the machine learning module based on error data from the first set of transactions but not the second set of transactions based on determining that the classification results for the second set of transactions do not match the expected distribution. In some embodiments, the computing system receives a request for authorization of an electronic transaction. In some embodiments, the computing system determines, using the trained machine learning module, whether to authorize the electronic transaction.

Figure 7:
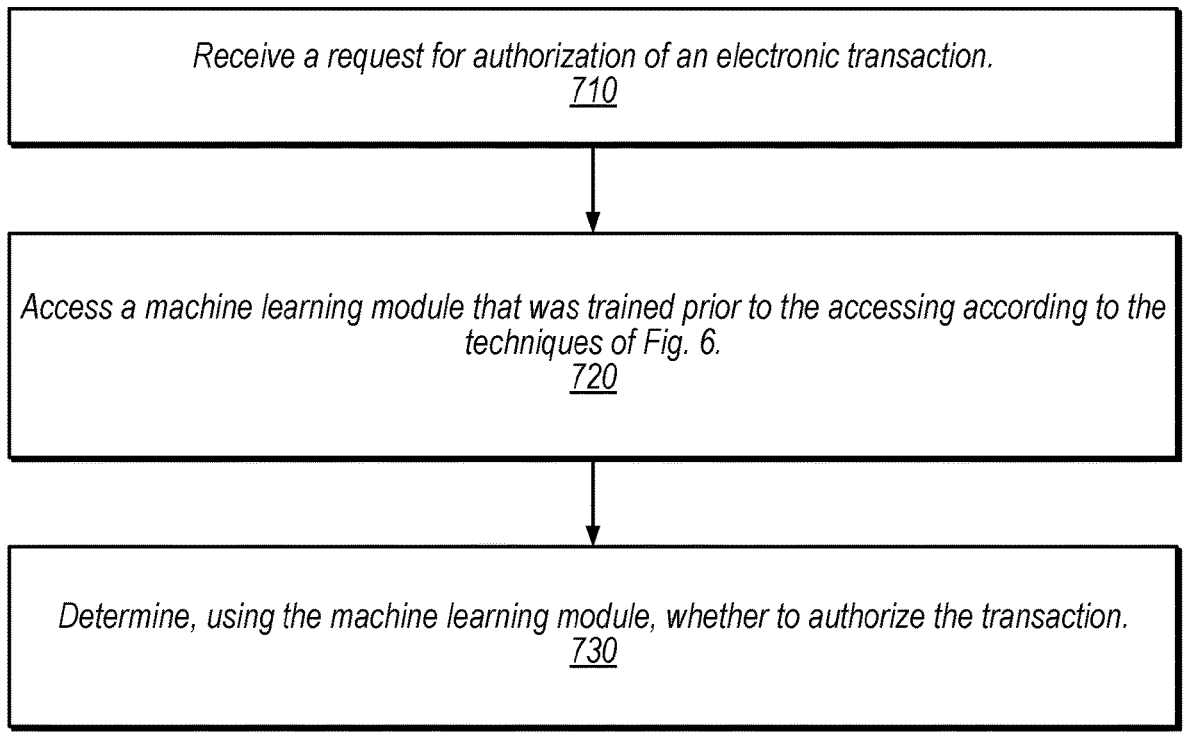
FIG. 7 is a flow diagram illustrating a method for classifying transactions using a trained machine learning module, according to some embodiments.

FIG. 7 is a flow diagram illustrating a method for classifying transactions using a trained machine learning module, according to some embodiments. The method shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 710, in the illustrated embodiment, a computing system receives a request for authorization of an electronic transaction. In some embodiments, the electronic transaction includes a user request to generate a new webpage in a social network.

At 720, the computing system the computing system accesses a machine learning module that was trained prior to the accessing using the techniques of FIG. 6. The machine learning module may include a neural network, for example.

In some embodiments, the machine learning module is trained by determining whether classification results for the second set of transactions include a threshold percentage of results that have a particular classification. In some embodiments, the machine learning module is trained by rolling back updates to the machine learning module, where the rolling back is performed based on determining that the classification results for the second set of transactions do not include the threshold percentage.

At 730, the computing system determines, using the machine learning module, whether to authorize the transaction. In some embodiments, the electronic transaction is an electronic monetary transaction. In some embodiments, the computing system determines to deny the electronic monetary transaction based on output of the machine learning module.

Example Computing Device

Figure 8:
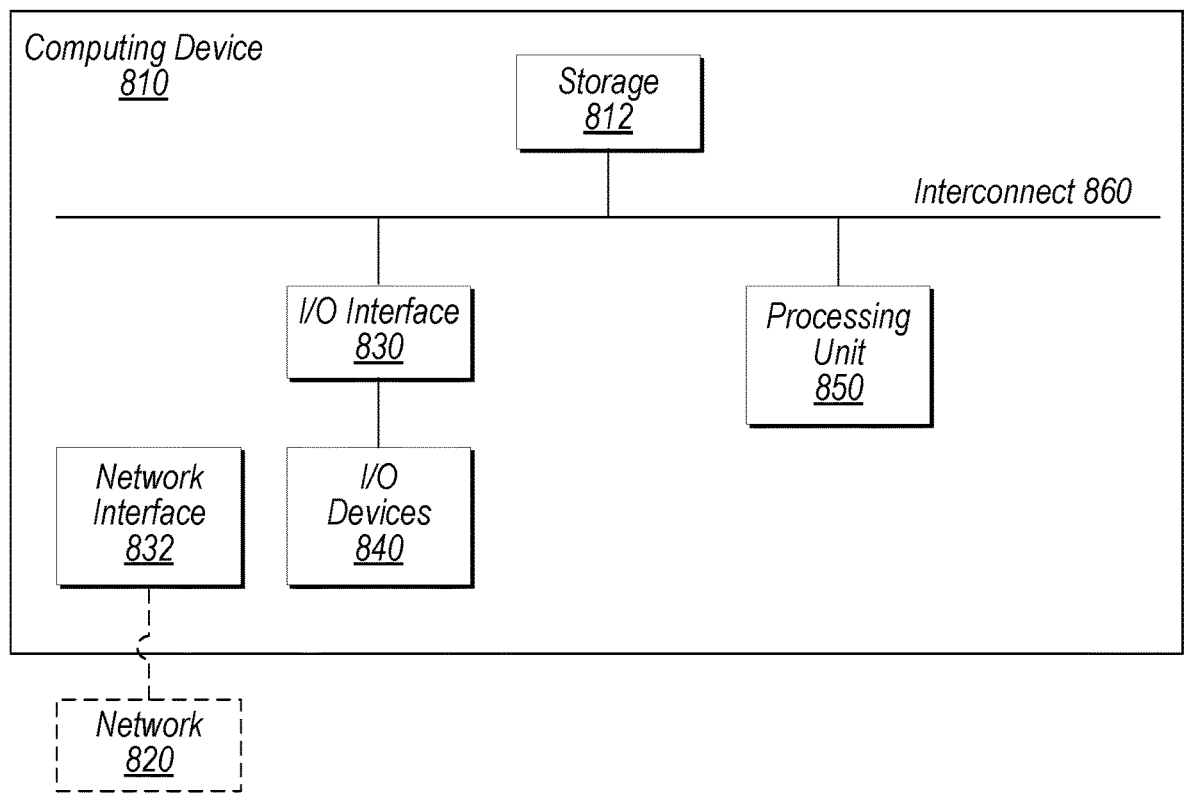
FIG. 8 is a block diagram illustrating an example computing device, according to some embodiments.

Turning now to FIG. 8, a block diagram of one embodiment of computing device (which may also be referred to as a computing system) 810 is depicted. Computing device 810 may be used to implement various portions of this disclosure. Computing device 810 may be any suitable type of device, including, but not limited to, a personal computer system, desktop computer, laptop or notebook computer, mainframe computer system, web server, workstation, or network computer. As shown, computing device 810 includes processing unit 850, storage 812, and input/output (I/O) interface 830 coupled via an interconnect 860 (e.g., a system bus). I/O interface 830 may be coupled to one or more I/O devices 840. Computing device 810 further includes network interface 832, which may be coupled to network 820 for communications with, for example, other computing devices.

In various embodiments, processing unit 850 includes one or more processors. In some embodiments, processing unit 850 includes one or more coprocessor units. In some embodiments, multiple instances of processing unit 850 may be coupled to interconnect 860. Processing unit 850 (or each processor within 850) may contain a cache or other form of on-board memory. In some embodiments, processing unit 850 may be implemented as a general-purpose processing unit, and in other embodiments it may be implemented as a special purpose processing unit (e.g., an ASIC). In general, computing device 810 is not limited to any particular type of processing unit or processor subsystem.

Storage subsystem 812 is usable by processing unit 850 (e.g., to store instructions executable by and data used by processing unit 850). Storage subsystem 812 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 812 may consist solely of volatile memory, in one embodiment. Storage subsystem 812 may store program instructions executable by computing device 810 using processing unit 850, including program instructions executable to cause computing device 810 to implement the various techniques disclosed herein.

I/O interface 830 may represent one or more interfaces and may be any of various types of interfaces configured to couple to and communicate with other devices, according to various embodiments. In one embodiment, I/O interface 830 is a bridge chip from a front-side to one or more back-side buses. I/O interface 830 may be coupled to one or more I/O devices 840 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for training machine learning models using input reconstruction results for unlabeled, incomplete transactions, comprising:

training, by a computing system, a machine learning module to classify electronic transactions, such that the machine learning module learns a characteristic of the electronic transactions that is indicative of different error data for those transactions, wherein the training uses a set of labeled transactions with labels indicating designated classifications for those transactions and a set of unlabeled transactions, and wherein the training includes:

generating first error data based on classification results generated by the machine learning module for the set of labeled transactions;
generating second, different error data based on reconstruction results generated via reconstruction of both the set of labeled transactions and the set of unlabeled transactions input into the machine learning module; and
updating the machine learning module based on the first and second error data; and
determining, by the computing system in response to receiving a request for authorization of a newly initiated transaction, to authorize the newly initiated transaction,
wherein the determining is performed using the machine learning module that is trained based on reconstruction results for both labeled and unlabeled transactions.

2. The method of claim 1, wherein the set of unlabeled transactions are incomplete transactions and the set of labeled transactions are completed transactions.

3. The method of claim 1, wherein transactions in the set of labeled transactions and the set of unlabeled transactions are electronic monetary transactions and wherein classifications output by the trained machine learning module specify whether transactions are authorized by an entity that had been requested to authorize those transactions.

4. The method of claim 1, further comprising:
determining whether classification results for the set of unlabeled transactions match, within a threshold degree, with an expected distribution of classification results for unlabeled transactions.

5. The method of claim 4, further comprising:
subsequent to the updating, further updating the machine learning module based on error data from the set of labeled transactions but not the set of unlabeled transactions based on determining that the classification results for the set of unlabeled transactions do not match the expected distribution.

6. The method of claim 1, wherein the reconstruction results indicate whether a model implemented by the machine learning module is stale.

7. The method of claim 1, further comprising:
tagging transactions in the set of unlabeled transactions to indicate that these transactions do not have label information, wherein one or more elements of the machine learning module are configured not to generate error data based on classification results for transactions of the set of unlabeled transactions based on detecting the tagging.

8. The method of claim 1, further comprising:
determining whether classification results for the set of unlabeled transactions include a threshold percentage of results that have a particular classification; and
rolling back updates to the machine learning module, wherein the rolling back is performed based on determining that the classification results for the set of unlabeled transactions do not include the threshold percentage.

9. The method of claim 1, wherein the reconstruction results are generated by generating output for the set of labeled transactions and the set of unlabeled transactions based on output of a first hidden layer of a neural network and not based on output of subsequent layers of the neural network.

10. A non-transitory computer-readable medium having instructions stored thereon that are executable by a computing device to perform operations comprising:

training a machine learning module to classify electronic transactions, such that the machine learning module learns a characteristic of the electronic transactions that is indicative of different error data for those transactions, wherein the training uses a set of labeled transactions with labels that indicate designated classifications for those transactions and a second, different set of unlabeled transactions, wherein the training includes:
generating first error data based on classification results generated by the machine learning module for the set of labeled transactions, wherein transactions in the set of labeled transactions are completed transactions;
generating second error data based on reconstruction results generated by an input reconstruction module for both the set of labeled transactions and the set of unlabeled transactions, wherein transactions in the set of unlabeled transactions are incomplete transactions; and
updating the machine learning module based on the first and second error data; and
determining, in response to receiving a request for authorization of a transaction, to authorize the transaction, wherein the determining is performed using the machine learning module that is trained based on reconstruction results for both labeled and unlabeled transactions.

11. The non-transitory computer-readable medium of claim 10, wherein transactions in the sets of transactions are electronic monetary transactions, and wherein transactions in the set of labeled transactions are approved transactions and transactions in the set of unlabeled transactions are denied transactions.

12. The non-transitory computer-readable medium of claim 10, wherein the operations further comprise:
determining whether classification results for the set of unlabeled transactions include a threshold percentage of results that have a particular classification.

13. The non-transitory computer-readable medium of claim 12, wherein the operations further comprise:
rolling back updates to the machine learning module, wherein the rolling back is performed based on determining that the classification results for the set of unlabeled transactions do not include the threshold percentage.

14. The non-transitory computer-readable medium of claim 10, wherein the operations further comprise:
tagging transactions in the set of unlabeled transactions to indicate that these transactions do not have label information, wherein one or more elements of the machine learning module are configured not to generate error data based on classification results for transactions of the set of unlabeled transactions based on detecting the tagging.

15. The non-transitory computer-readable medium of claim 10, wherein the first error data indicates differences between the classification results and the designated classifications, and wherein the second error data indicates differences between the reconstruction results and input being reconstructed.

16. A method, comprising
receiving, by a computing system, a request for authorization of an electronic transaction;
accessing, by the computing system, a machine learning module that was trained such that the machine learning module learns a characteristic of the electronic transactions that is indicative of different error data for those transactions, wherein the machine learning model is trained prior to the accessing, by:

generating first error data based on classification results generated by the machine learning module for a first set of labeled transactions with labels indicating correct classifications for those transactions;

generating second, different error data based on reconstruction results generated via input reconstruction for both the first set of labeled transactions and a second set of unlabeled transactions; and updating the machine learning module based on the first and second error data; and determining, by the computing system using the machine learning module that is trained based on reconstruction results for both labeled and unlabeled transactions, to authorize the electronic transaction.

17. The method of claim 16, wherein the machine learning module includes a neural network with a plurality of layers, and wherein the updating the machine learning module includes altering training weights for one or more nodes of the neural network.

18. The method of claim 16, wherein the electronic transaction is an electronic monetary transaction, and wherein the method further comprises:

determining, by the computing system based on output of the machine learning module, to deny the electronic monetary transaction.

19. The method of claim 16, wherein the second error data indicates differences between the reconstruction results and input being reconstructed.

20. The method of claim 16, wherein the reconstruction results indicate whether a model implemented by the machine learning module is stale.

\* \* \* \* \*